United States Patent [19]
Halladay et al.

[11] 3,821,443
[45] June 28, 1974

[54] NUTRITIOUS FILLING COMPOSITION AND PRODUCT

[75] Inventors: Paul D. Halladay, Battle Creek, Mich.; John W. Dougherty, Kankakee, Ill.

[73] Assignee: General Foods Corporation, White Plains, N.Y.

[22] Filed: Aug. 28, 1972

[21] Appl. No.: 284,311

[52] U.S. Cl. ............... 426/93, 426/163, 426/196, 426/201
[51] Int. Cl. .............................................. A23g 3/00
[58] Field of Search ............ 99/139, 134, 86, 83, 1; 426/89, 93

[56] References Cited
UNITED STATES PATENTS

| | | | |
|---|---|---|---|
| 2,738,277 | 3/1956 | Cryns | 99/83 |
| 3,185,574 | 5/1965 | Gabby et al. | 99/86 |
| 3,194,666 | 7/1965 | Bedenk et al. | 99/139 |
| 3,431,112 | 3/1969 | Durst | 99/1 |
| 3,464,830 | 9/1969 | Wahba | 99/139 |
| 3,533,802 | 10/1970 | Cooper et al. | 99/86 |

*Primary Examiner*—A. Louis Monacell
*Assistant Examiner*—J. M. Hunter
*Attorney, Agent, or Firm*—Bruno P. Struzzi

[57] ABSTRACT

The invention relates to a cereal bar containing at least one layer composed of a farinaceous ingredient and at least one layer composed of a nutritious filling composition. The filling is composed basically of a mixture of an oil normally liquid at body temperatures, sugar, and a synergistic combination of protein source, namely, soy protein and egg white solids.

9 Claims, No Drawings

NUTRITIOUS FILLING COMPOSITION AND PRODUCT

BACKGROUND OF THE INVENTION

There are many convenient foods on the market today designed particularly for the consumer who is interested in nutrition but does not have the time to prepare conventional balanced meals. Typical of such foods are the so-called instant breakfasts designed to be combined with milk and consumed at the beginning of the day. This type of food, however, does not suit the needs of the consumer who finds himself away from home in the morning or throughout the day. The needs of this consumer are more satisfied by a quick snack type item which can be carried on the person and which can be consumed quickly and inconspicuously and which is organoleptically acceptable to the consumer.

It is known in the prior art to prepare nutritious bars based on a mixture of cereal, sugar, fat and protein sources. For example, U.S. Pat. No. 2,738,277 discloses the preparation of a cereal bar from a mixture of flour, sugar, egg albumin, shortening, salt, flavoring and the like. The ingredients are all uniformly mixed and the bar is formed by compressing the mixture under high pressure. Similarly, U.S. Pat. No. 2,824,806, discloses the preparation of a cereal bar which comprises mixing non-fat milk solids and melted shortening with a moistened sugar coated cereal flake composition, forming the composition into a bar and subjecting the composition to a pressure of at least 500 psi. In each of these patents, the disclosed product is intended mainly as a survival ration. The products are severely compressed for storage reasons and are not particularly organoleptically attractive.

SUMMARY

The present invention is concerned with a unique combination of ingredients which yields a highly palatable, protein nutritious, easy to handle and shelf stable food product. The prime components of the food bar of this invention are a creamy nutritious frosting-like confectionery component and a farinaceous component comprising cake or a cereal bound in a matrix comprising fat and sugar. The filling composition is based on a mixture of an oil, sugar, and a mixture of soy protein and egg white solids.

The filling may also contain sugar, vitamins, flavorings, colorings, stabilizers and the like. The filling is prepared by adding the protein source material, sugar and other ingredients to the oil or liquid fat, and making these vigorously to form a creamy dispersion of the ingredients in the fat. Under vigorous agitation such as Hobart mixer, the confection exhibits a whipped character. This whipping property is due to the combination of hydrogenated vegetable oil and protein solids. The proteins hold the aeration and make possible the heating of the filling without excessive loss of aeration and running of the filling.

In the preferred embodiments of the present invention the filling is used in combination with a cereal component or a cake component. The cereal component is in the form of a flake or puffed cereal which is bound using, preferably, a fat/sugar matrix system. The binder may also contain other ingredients such as corn syrup, flavorings, minerals, colorings and the like. The filling may also be used in combination with a cake component, preferably one which has been formulated so as to be shelf stable over a period of at least six months.

The filling may be used as a frosting on either the cereal or cake component, or it may be used as a filling in between several layers of a cake or cereal component.

DETAILED DESCRIPTION OF THE INVENTION

The oils used in preparing the confection of this invention are generally those oils which exhibit liquid properties at or below body temperature, that is, about 100°F. Examples of suitable oils are vegetable oils such as coconut oil, cottonseed oil, safflower oil, and the like. Any vegetable or animal oil exhibiting liquid properties at or below about 100°F and having a suitably bland flavor may be employed. The oils may be partially or totally hydrogenated.

The protein sources used in the filling of this invention are a mixture of egg white solids (egg albumin) and soy protein. Any form of soy protein may be used, such as soy flour, which contains about 30 to 70 percent protein, soy protein concentrates containing 70 to 90 percent protein or soy protein isolates containing at least 90 percent protein. The preferred protein source material is the soy isolate containing 90 to 100 percent protein. These materials may be used in the relative proportions of 30 to 70 percent (by weight) of the egg white solids and corresponding 30–70 percent by weight soy protein. This combination imparts an unexpectedly high Protein Efficiency Ratio to the filling composition, much higher than would be expected by calculation, as will be hereinafter discussed.

The amount of the protein source combination employed by the confectionary composition may vary depending on the nutritional value desired. Generally speaking, these materials may be used at a level of about 10–40 percent by weight of the confection. Aside from the nutritional aspects, the egg white solids also impart whipping properties to the filling composition. This whipping property is due to the combination of the vegetable oil and the solids. The protein holds the aeration and makes possible the heating of the filling without excessive loss of aeration and the running of the filling.

The filling also contains a sweetener such as sugar present to suit taste. The sugar should be very finely granulated (6X) or in liquid form. Coarsely granulated sugar would severely detract from the palatability and mouth feel of the filling. Sugar may be present to suit taste and generally in the range of about 10%-40% by weight of the filling composition.

Vitamins such as A, $B_1$, $B_2$, $B_6$, $B_{12}$, C, D, E and Niacin may be added in appropriate amounts to supply any desired percentage of the minimum daily requirement. Minerals such as Calcium (Calcium Phosphate-Tribasic), Phosphorous (Sodium Phosphate-Dibasic), Iodine (Potassium Iodide), Iron (Ferrous Fumarate) or Magnesium (Magnesium Oxide) may also be added. Where vitamins and minerals are both used in the formulation of a cereal bar containing a filling layer, it is desirable to include the vitamins in one phase, say the filling, and minerals in the other phase, i.e., the cereal binder. This segregation of these ingredients prevents the possibility of their degradation caused by the reaction of the vitamin compounds with the mineral source materials.

The filling may also contain additives which impart improved heat stability to the filling. For example, the incorporation of a mixture of silicon dioxide and a polyhydric alcohol or polyhydric alcohol ester bridging agent into a low melting point oil increases the high temperature stability of the oil and prevents the oil from running or weeping out of the filling composition after prolonged periods of storage at room temperature or temperatures within the range of 70°–110°F. The fat present in the filling may be so stabilized by incorporating in the fat from about 0.1 to about 11 percent by weight of the silicon dioxide and from about 0.1 to 7 percent by weight of the bridging agent. This technology is disclosed in commonly assigned co-pending application Ser. No. 96,649, filed on Dec. 9, 1970, now U.S. Pat. No. 3,669,681.

No water, milk or other aqueous ingredient is used in preparing the filling composition. The only moisture present in the filling is that which is present in the ingredients used in its preparation. Because of the very low moisture content, the filling exhibits shelf stability over a period of six months or more. In general, the moisture content of the filling is less than 5 percent by weight, preferably 2–3 percent by weight.

The filling composition is best prepared by mixing the dry components, i.e., the sugar, egg white solids, soy protein, and any other additives with the oil. The oil is preferably heated above about 110°F at the time of mixing, as this facilitates the aeration of the oil. The mixture is then aerated by subjecting it to vigorous agitation using a high speed mixer such as a laboratory Mixmaster or an impellor mixer until a filling having the desired light, fluffy consistency is obtained.

In some instances, it has been found that the filling may have a tendency to become crumbly or mealy after being subjected to elevated temperatures for an extended period of time. The condition is believed to be the result of the absorption of the lower melting point fractions of the oil by the protein sources which causes the filling to lose its plasticity or creaminess. This condition may be overcome by thoroughly mixing the protein sources at ambient or elevated temperatures with a sufficient amount of oil to saturate the protein and form a paste, and then incorporating the oil saturated protein with the remaining oil and other ingredients and mixing as described above.

As indicated, the filling may be used in combination with a cereal bar type product, cake type product or other farinaceous component. A cereal bar may generally be prepared by combining commercially available cereal flakes such as Post Toasties, with a liquid binder composition, thoroughly mixing the cereal with the binder and forming a sheet of the bound cereal. After permitting the cereal sheet to harden, the sheet may be coated with the filling, more of the bound cereal may be added on top of the filler to form a laminate of cereal, filling, and cereal.

Cereal binders useful for the purpose of this invention may be made of sugar, polyhydric alcohol, oils, or combinations of these. The preferred binder comprises mainly a vegetable oil such as corn oil or cottonseed oil. It is not necessary that the fat or oil used in the binder be liquid at body temperature; fats having a Wiley melting point of up to 120°F may be used. The binder may also contain sugar, salt, corn syrup solids and other ingredients such as minerals, vitamins and the like. The binder is thus prepared by adding sugar, minerals and other ingredients to liquid oil and mixing thoroughly at a temperature above the melting point of the oils. The binder is then combined with cereal flakes in a ratio of about 20 to 80 parts of binder per correspondingly 80 to 20 parts of cereal. Preferably, the binder and cereal are combined in approximately 50/50 ratios. Materials are mixed by combining the cereal and liquid binder and gently agitating in a mixer until the cereal flakes are completely and thoroughly dispersed with the binder. Mixing may be carried out using a Ribbon Mixer, Paterson Kelley V blender, a rotating drum or other device which provides gentle mixing to prevent excessive breakage of the cereal flake. Where the binder contains an oil, it is preferred to mix the cereal and binder at temperatures above about 110°F or the melting point of the oil.

The cereal bar may be formed by placing the desired amount of the cereal/binder mixture into a mold having the desired dimensions and applying gentle and uniform surface pressure sufficient to compact the mixture without causing excessive fracturing of the cereal particles. Where the binder contains a fat or oil, the temperature of the mixture prior to the molding operation should be such that the fat or oil is liquid. The filling layer is then applied evenly over the lower layer of compressed cereal and the top layer of cereal/binder mixture applied and compressed in the same manner as was the lower layer. Best results in terms of bar appearance are obtained if the lower layer of bound cereal is quick cooled in order to solidify the fat present in the binder prior to the application of the filling, as this prevents substantial commingling of the filling and cereal layers. The filling may be applied at a temperature above the melting point of the fat or oil contained therein or it may be applied cold in the form of a solid sheet which has been pre-cut to the appropriate dimensions.

The following examples are illustrative of the invention.

EXAMPLE I

A nutritious aerated filling composition was prepared from the following ingredients.

| | Parts |
|---|---|
| Hydrogenated Vegetable Oil (Durkee Kaola "D") | 12.00 |
| Soy Protein Isolate (Supro 610 — 95% Protein) | 4.50 |
| Egg White Solids (Henningsen's Type P-20) | 4.50 |
| Sugar (6X) | 6.40 |
| Glycerine | 0.13 |
| Silicon Dioxide (Cab-O-Sil) | 0.51 |
| Flavor | .01 |
| Preservatives (BHA+EDTA) | .02 |
| Total | 28.07 |

The filling was prepared by adding the glycerine, silicon dioxide and preservatives to the oil at about 140°F–180°F and mixing for about 2 minutes in a Hobart Mixer. The sugar, soy protein, egg white solids and flavoring were then added and the composition was mixed at high speeds for several minutes until a viscous, aerated frosting-like filling was obtained.

The filling composition was then poured onto a cool cookie sheet and cooled to about 40°F, well below the melting point of the oil. Rectangular sections of the filling having the approximate dimensions of 1⅝ inches by 3 -9/16 inches by three-sixteenths inch were cut for use in combination with the cereal layers of the bar.

The cereal portion of the bar was prepared by mixing corn flakes sized through a U.S. No. 5 screen and retained on a U.S. No. 10 screen with an equal amount of binder. The binder was prepared by mixing the following ingredients at about 140°F:

|  | Parts |
|---|---|
| Hydrogenated Vegetable Oil | 19.04 |
| Glycerine | 0.39 |
| Silicon Dioxide (Cab-O-Sil) | .57 |
| Sugar (6X) | 9.52 |
| Salt | 0.12 |
| Corn Syrup | 3.50 |
| Minerals | 1.90 |
| Total | 35.04 |

About 20 grams of the cereal/binder mixture at a temperature of 140°F was placed in a wooden mold having an inner dimension of 1⅝ inches by 3 9/16 inches, leveled, and gently compressed using a plunger to a thickness of about one-fourth inch. A 16 gram sheet of the pre-cut filling as prepared above was placed in the mold on top of the compressed layer of cereal and subsequently a second layer of the cereal/binder mixture applied on top of it and compressed as above. The assembly was quick cooled to about 40°F and removed from the mold.

The finished bar has a cereal content of about 35.7 percent, a binder content of about 35.7 percent and a filling content of about 28.6 percent by weight. The overall moisture content of the bar is about 2.5 percent.

The bar was packaged in a moisture impermeable wrapping material and exhibited shelf stability for a minimum period of at least 6 months. The oil component of the bar was found not to run even after prolonged exposure to temperatures in excess of the melting point of the oil.

As indicated above, the actual Protein Efficiency Ratio (PER) for the filling composition of this invention is unexpectedly higher than the PER as theoretically calculated. PER may be calculated according to the following mathematical formula:

$$PER = 5.264 \ (0.065 \ \text{percent} \times \text{percent Deficit limiting amino acid})$$

The percent Deficit limiting amino acid is determined by analyzing each protein source to determine the amount of each of the essential amino acids present. These values are also available in the literature. Using whole egg as a standard, the percent Deficit of limiting amino acids is obtained by comparing the combined amounts of amino acids in the given product with the combined amounts in whole egg.

The actual PER is determined by rat feeding studies conducted over a 28 day period. In this test the amount of protein eaten (fed at 10 percent in the test diet) is related to the amount of weight gain by the rats during the 28 day period. Thus, a PER of 4.00 means that for every gram of protein consumed during the 28 days, 4.00 grams of weight were gained per day.

The calculated PER for the filling prepared according to this example is 3.81. The actual PER as determined by 28 day rat feeding studies was 4.36. The filling is thus specifically formulated using the combination of soy protein and egg white solids to give rise to PER's in excess of 4.00.

EXAMPLE II

A nutritious aerated filling composition was prepared from the following ingredients:

|  | Parts |
|---|---|
| Hydrogenated Safflower Oil | 45.5 |
| Soy Protein (Supro 610 — 95% Protein) | 14.0 |
| Egg White Solids | 14.0 |
| 6X Sugar (Vitamin fortified-⅓ MDR) | 25.0 |
| Flavorings | 1.5 |
| Total | 100.00 |

The filling was prepared by combining the ingredients, mixing and whipping as in Example I.

A cereal binder was prepared by mixing the following ingredients:

|  | Parts |
|---|---|
| Hydrogenated Vegetable Oil | 59.5 |
| Silicon Dioxide (Cab-O-Sil) | 1.2 |
| Glycerine | 1.0 |
| Sugar (6X) | 29.6 |
| Minerals | 7.2 |
| Flavorings | 1.5 |
| Total | 100.0 |

Samples of three cereal bars based on corn flakes, puffed rice and wheat flakes were prepared by mixing the above binder and appropriate cereal and fabricating bars, by the method employed in Example I such that the finished three layered bars were of the following composition:

|  | Corn Flakes | Puffed Rice | Wheat Flakes |
|---|---|---|---|
| Cereal | 30.7% | 20.3% | 31.3% |
| Binder | 38.6 | 42.4 | 38.6 |
| Filling | 30.7 | 37.3 | 30.1 |
| Total | 100.0% | 100.0% | 100.0% |

The bars were packaged in moisture impermeable wrapping material and exhibited no deterioration in texture or flavor after storage for a period of 6 months.

Although the present invention has been illustrated by embodiments wherein the nutritious confectionery filling is used in combination with a bound cereal, it is to be emphasized that the filling may be used in combination with any farinaceous material with which it is desirable to use a filling or frosting. The term farinaceous material is intended to include cereals, whether in flaked or puffed form, and bakery products such as cakes, pastries, cookies and the like.

Bakery products which are not inherently shelf stable for periods of up to 6 months or more should be specifically formulated in order to impart thereto extended stability under room temperature storage conditions. For example, the shelf like of conventional cake and pastry items having moisture contents of 15 to 30 percent may be greatly extended by inclusion in the formulation of from about 1 to 10 percent by weight of an edible polyhydric alcohol such as glycerol, lower alkylene glycols, sorbitol and the like. These additives serve to retard staling as well as to prevent bacteriological degredation. It is also desirable to include up to 2 percent by weight of an antimycotic such as potassium sorbate benzoic acid, propionic acid, alkali or alkaline earch metal sals of these acids and like antimycotics known to those skilled in the art. After conventional baking of the cake, the protein nutritious confection of this invention may be applied to the cake as a frosting, filling or frosting and filling. The cake may then be packaged in a moisture impermeable wrapping material and, optionally, gas flushed as is known in the art to further enhance shelf stability.

What we claim is:

1. A nutritious, shelf stable confectionary composition comprising a whipped intimate mixture in the form of an areated frosting or filling containing 10–40 percent sugar, 30–70 percent of an oil normally liquid at 100°F, or below, and 10–40 percent of a protein source material comprising a mixture of 30–70 percent by weight soy protein source material and 70–30 percent egg white solids, said confectionary composition having a moisture content of less than about 5 percent by weight.

2. The confectionary composition of claim 1 wherein the soy protein source material has a protein content of at least 70 percent by weight.

3. The confectionary composition of claim 1 further characterized as having an actual Protein Efficiency Ratio of at least 4.00.

4. The confectionary composition of claim 1 which further contains an effective amount of a heat stabilizing agent comprising a mixture of silicon dioxide and an edible polyhydric alcohol or edible polyhydric alcohol ester.

5. A food bar comprising a laminate of at least one layer of farinaceous material selected from the class consisting of cereal and bakery products; and at least one layer of the confectionary composition of claim 1.

6. The food bar of claim 5 wherein said farinaceous material is bound in a matrix selected from the class consisting of sugar, polyhydric alcohol, oils and combinations thereof, the matrix being employed with the farinaceous material in a ratio of 20–80 parts matrix and 80–20 parts farinaceous material.

7. A three layered food bar comprising two outer layers of cereal flakes bound in a matrix material comprising a mixture of an oil having a Wiley Melting Point of less than 120°F, sugar and corn syrup solids, and an inner layer comprising the confectionary composition of claim 1, said inner layer constituting less than 50 percent by weight of the food bar.

8. The confectionary composition of claim 6 wherein the level of silicon dioxide is 0.1–11.0 percent and the edible polyhydric alcohol or edible polyhydric alcohol ester is between 0.1–0 percent by weight of the filling.

9. The food bar of claim 8 wherein said farinaceous material comprises cereal particles and said matrix comprises a mixture of oil and sugar.

* * * * *